Feb. 6, 1934.　　H. BUECKERT ET AL　　1,945,592
PURIFICATION OF ACETYLENE
Filed Nov. 19, 1931
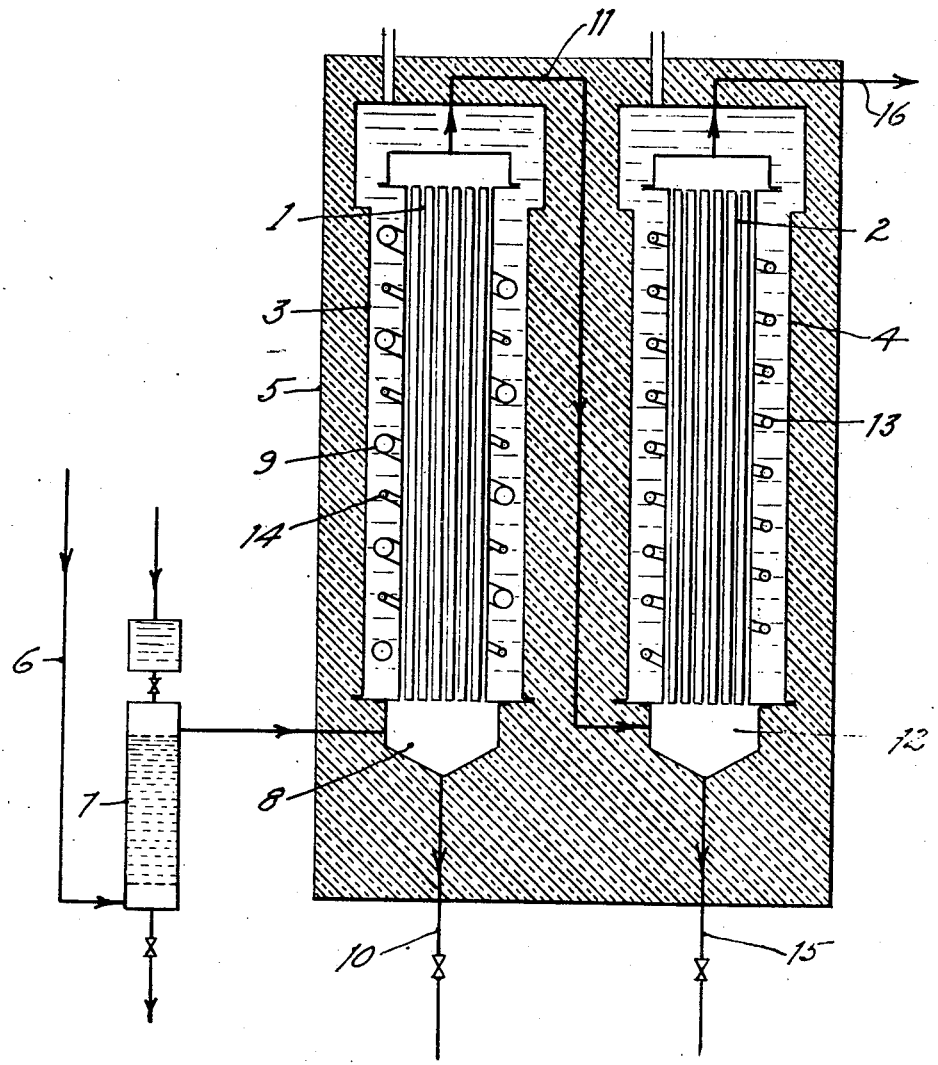
INVENTORS
HANNS BUECKERT
ROBERT STADLER
HELMUT TANNEBERGER
BY Hauff & Harland
ATTORNEYS Patented Feb. 6, 1934

1,945,592

UNITED STATES PATENT OFFICE 1,945,592

PURIFICATION OF ACETYLENE

Hanns Bueckert, Ludwigshafen-on-the-Rhine, Robert Stadler, Ziegelhausen, and Helmut Tanneberger, Mannheim, Germany, assignors to I. G. Farbenindustrie Aktiengesellschaft, Frankfort-on-the-Main, Germany Application November 19, 1931, Serial No. 576,098, and in Germany November 20, 1930

3 Claims. (Cl. 183—115)

The present invention relates to improvements in the purification of acetylene.

The purification of acetylene containing other strongly unsaturated compounds, such as diacetylene, allylene, allene or butadiene or several of these substances, especially of the gas mixtures, containing acetylene obtained by thermal treatment, for example in the electric arc, of hydrocarbon products of any kind, in particular vaporized hydrocarbons, which term for the purpose of the present invention comprises gaseous saturated hydrocarbons, such as methane or ethane or the like, or unsaturated hydrocarbons of the olefinic series, such as ethylene or propylene, or vaporized liquid aliphatic or cyclic hydrocarbons or the said liquid hydrocarbons in the form of mist, or of liquid hydrocarbons in bulk, for example by passing an electric arc therethrough, or of coals of any variety passed through the electric arc in the form of dust, is attended with great difficulty.

The electric arc treatment may be replaced by heating the said materials in a proper form to temperatures above 1000° C., preferably above 1400° C., for example by partial combustion with gases comprising oxygen. Although the amount of the said impurities in acetylene produced in the said thermal treatments is usually very small as for example about 0.3 per cent, the impurities injuriously affect the further working up of the acetylene, as for example into acetaldehyde by means of solid catalysts or by means of acid solutions containing mercury. The acetylene cannot be freed satisfactorily from the said impurities by washing out or adsorbing the acetylene from the gas from the electric arc, because compared with acetylene they have a greater solubility or capacity of being adsorbed by solid absorbing agents so that they are likewise enriched and therefore the gas recovered from the washing liquid or the adsorption agent contains from 2 to 5 per cent of the said impurities depending on the amount of impurities in the gas from the electric arc.

We have now found that a satisfactory separation of acetylene from the said strongly unsaturated substances is effected by subjecting the mixture to strong cooling, i. e. cooling to temperatures of 20° below zero C., preferably of 30° below zero C. and below, care being taken that temperatures at which solid acetylene separates are avoided and the conditions being such that a condensation of acetylene is precluded. Thus for example solid acetylene separates out at 81° below zero C. or at lower temperatures if its partial pressure attains one atmosphere. By carrying out the cooling as hereinafter described the condensed products may be separated in a liquid state by reason of their mutual solubility, although in the case of some of them, as for example diacetylene and hydrocyanic acid, the freezing point lies higher than the cooling temperature. For example when starting with concentrated, from 85 to 90 per cent acetylene, the impurities are preferably condensed by cooling to from about 70° to 80° below zero C. without the application of pressure, whereby the solvent vapour present in the acetylene (which is recovered from the gas mixture issuing from the electric arc by absorption by means of a suitable solvent, such as cyclohexanone or acetone) may be precipitated at the same time. If diluted acetylene is to be purified in the same manner, the cooling is carried out at from 70° to 80° below zero C., preferably at increased pressure. For example the purification of a from 7 to 9 per cent gas may be effected at from 15 to 26 atmospheres. Gases having a high concentration of acetylene are advantageously treated under atmospheric pressure because at elevated pressures concentrated acetylene is liable to explode. Contrary to expectation, a separate purification from hydrocyanic acid has proved to be unnecessary because the hydrocyanic acid contained as an impurity in the acetylene from the electric arc is also almost completely removed by condensation and solution in the other condensed products.

The process according to the present invention may be carried out for example as follows:

The cooling of the gas for example down to temperatures of 30° below zero C. is preferably carried out in several stages in order to effect a better separation of the condensed constituents, whereby in the first stage the water and, if any, also the solvent vapours contained in the gas mixture are separated in the liquid phase, and then the impurities which are gaseous at ordinary temperatures are obtained in a liquid state at lower temperatures. For example if acetylene which has been obtained from dilute acetylene by enrichment by treatment with cyclohexanone is purified according to the present invention, the solvent contained in the gas is condensed and recovered in the first stage of the cooling (30° below zero C.).

The usual arrangements of coolers as for example coils and heat exchangers are suitable for the cooling of the gases. It is particularly advantageous to add small amounts of solvent or solvent vapour, as for example crude methanol vapour, to the gases to be cooled, especially before the first stage of cooling, or to spray the same directly into the cooler, because in this manner the separation of frozen constituents is avoided and a slight saving of cooling members is effected. Furthermore, it is preferable to cause the gas to flow upwards through the cooler, since in this manner the condensate flows in counter current to the gas current, namely downwards in the cooler into the warmer zone, whereby it is prevented from becoming solid or pasty. The condensate is collected in a separator outside the cooler but still within the insulation. Thus for example the condensate in the second stage of the cooling assumes the temperature of the gas coming from the first stage, whereby it is warmed from 75° to 30° below zero C. In this manner a new effect is obtained, because the product liquefied in the colder zone contains acetylene dissolved therein and this is to a very great extent expelled at 30° below zero C.

The gas obtained may be directly subjected to further chemical or physical treatment under pressure. Thus dilute acetylene purified according to the present invention may be enriched by washing with solvents under pressure and if desired at low temperatures. The carrying out of this process of enriching the acetylene is considerably simplified by the gas purified at low temperatures; for example the impurities in acetylene from the electric arc lead to changes in the solvent which render a continuous operation impossible without intermediate complicated preparation of the solvent.

A great advantage of the process according to the present invention consists in the fact that the products separated are obtained in such a condition that they may be readily further worked up. On the contrary when active masses alone are employed for the purification, the products must be recovered again by a special process, whereby disadvantages by reason of polymerization and a consequent rapid impairing of the activity of the active masses are not readily avoided. Moreover, the waste of acetylene when working with active masses alone is considerably greater than by the process according to the present invention.

A further advantage of the process according to the present invention resides in the fact that even with a varying content of impurities in the gas mixture, the gas obtained by the said treatment has a physically uniform degree of purity at the temperature employed, while the gas purified for example by the employment of active masses, such as active carbon, may contain different amounts of the said impurities depending on the degree of saturation of the active mass and the amount of impurities in the crude gas, whereby the further working up is injuriously affected.

Furthermore very little of the acetylene is lost by carrying out the purification in the said manner. Less than 0.5 per cent of the acetylene are wasted during the precipitation.

If, for certain purposes, it is desired to remove the last traces of the said impurities, this may be effected directly after the cooling process by the employment of very active adsorbents, as for example silica gel.

The invention will be further explained with reference to the accompanying drawing showing a vertical section of a preferred arrangement suitable for carrying into effect the process according to the present invention. It is, however, to be understood that the invention is not restricted to the particular arrangement shown in the said drawing.

Referring to the drawing in detail numerals 1 and 2 denote two bundles of cooling tubes which are arranged in vessels 3 and 4 respectively filled with a cooling liquid. The said vessels are mounted in a heat-insulating box 5 which is filled with a suitable insulating material, such as slag-wool or cork bricks. The initial acetylene gas to be purified is introduced, while at room temperature, at 6 into a vessel 7 filled with methanol and after being laden with vapours of methanol, passed to the collecting vessel 8 and from thence into the bundle of cooling tubes 1 communicating therewith in which it is cooled down in vessel 3 to about 30° below zero C. by means of crude methanol brought to a temperature of about 35° below zero C. by expanding and vaporizing liquid ammonia in the vaporizing coil 9. In tubes 1 any moisture present in the acetylene gas is condensed together with the methanol vapours and, if any, with vapours of the solvent employed for concentrating the acetylene. The condensate collects in vessel 8 and may be withdrawn at 10. Also part of the unsaturated impurities is condensed in the upper part of the cooling tubes 1. These condensed impurities, however, are for the most part again vaporized when flowing down into the less cold zones of the tubes. The uncondensed gases having a temperature of about 30° below zero C. are then led by way of pipe 11 into the collecting vessel 12 and from thence into the second bundle of cooling tubes 2 embedded in crude methanol which is cooled to about 75° below zero C. by expanding and vaporizing liquid ethylene in the coil 13. The ethylene employed, before being expanded, is condensed by passing it through a coil 14 advantageously arranged in cooling vessel 3. In said tubes 2 the temperature of the acetylene gas is lowered from 30° below zero C. to about 70° below zero C. whereby any unsaturated impurities are condensed together with traces of methanol vapours still present in the gas. The condensed constituents flow back into vessel 12 from which they may be withdrawn at 15. If any acetylene is condensed in the upper parts of the cooling tubes 2 it is vaporized again when flowing down into the lower less cold zones of these tubes, so that the liquid withdrawn at 15 is practically free from acetylene whereas the acetylene gas leaving at 16 is free from any strongly unsaturated impurities. The methanol present in vessel 7 may be replaced by any other liquid readily giving off vapours and preventing from freezing the water condensed in tubes 1 by dissolving it.

The following examples will further illustrate the nature of this invention but the invention is not restricted to these examples.

*Example 1*

2.4 cubic metres per hour of a gas containing about 89 per cent of acetylene and 4 per cent of diacetylene, allylene, allene and butadiene, the remainder being methane and nitrogen, are passed at a speed of flow of about 25 centimetres per second through an iron tube about 2 metres in length kept at about 30° below zero C. and then through a second similar tube maintained at a temperature of about 70° below zero C. In this manner about 42 litres of gas per cubic metre of the through-put are condensed in the second cooling stage (115 cubic centimetres of condensate). Of this gas, 40 litres are the said impurities and 2 litres are acetylene, i. e. about 0.1 per cent of the purified acetylene.

The gas leaving the cooler is used directly for the preparation of acetaldehyde by the catalytic conversion of acetylene with steam. By working with the gas purified in the said manner the duration of the activity of the catalyst is considerably lengthened and an excellent aldehyde is obtained.

Example 2

2 cubic metres per hour of a gas consisting of about 9 per cent of acetylene, 0.4 per cent of diacetylene, allylene, allene and butadiene, 0.8 per cent of hydrogen cyanide, from 20 to 25 per cent of methane, from 2 to 9 per cent of nitrogen and the remainder of hydrogen are passed with a rate of flow of about 10 centimetres per second under a pressure of about 25 atmospheres through a cooler maintained at a temperature of 70° below zero C. and having a length of about 180 centimetres. About 16.5 cubic centimetres of a liquid condensate, consisting of the impurities contained in the gas and only traces of acetylene, are thereby condensed from each cubic metre of initial gas. The gas leaving the condenser is admirably suited for a further treatment as for example for enrichment in acetylene or for conversion into acetaldehyde.

What we claim is:—

1. A process of increasing the concentration of acetylene in a gas mixture containing acetylene, diacetylene, allene, allylene and butadiene, obtained by thermal treatment of a hydrocarbon above 1000° C. which comprises cooling the gas mixture to a temperature below —30° C. and continuing said cooling to a temperature approximately —70° C., such that the concentration of the acetylene in the gas is considerably increased, but above the temperature at which acetylene is condensed.

2. A process for increasing the concentration of acetylene in a gas mixture containing acetylene, diacetylene, allene, allylene and butadiene, obtained by thermal treatment of a hydrocarbon above 1000° C. which comprises cooling the gas mixture to a temperature of about —70° C.

3. A process for the purification of a gas comprising acetylene, diacetylene, allene and butadiene, obtained by passing a vaporized hydrocarbon through an electric arc, from other strongly unsaturated compounds which comprises cooling the said gas to a temperature of about 30° below zero C. and then in a second stage to a temperature of about 70° below zero C.

HANNS BUECKERT.
ROBERT STADLER.
HELMUT TANNEBERGER.